US008439402B2

(12) United States Patent
Camus et al.

(10) Patent No.: US 8,439,402 B2
(45) Date of Patent: May 14, 2013

(54) OPTICAL STRUCTURE, IN PARTICULAR FOR A SECURITY DOCUMENT AND/OR A DOCUMENT OF VALUE

(75) Inventors: Michel Camus, Rives sur Fure (FR); Henri Rosset, Le Pin (FR)

(73) Assignees: Arjowiggins, Issy les Moulineaux (FR); Arjowiggins Security, Issy les Moulineaux (FR)

(*) Notice: Subject to any disclaimer, the term of this patent is extended or adjusted under 35 U.S.C. 154(b) by 988 days.

(21) Appl. No.: 12/085,033

(22) PCT Filed: Nov. 16, 2006

(86) PCT No.: PCT/FR2006/051186

§ 371 (c)(1), (2), (4) Date: Dec. 15, 2008

(87) PCT Pub. No.: WO2007/057613

PCT Pub. Date: May 24, 2007

(65) Prior Publication Data

US 2009/0121473 A1 May 14, 2009

(30) Foreign Application Priority Data

Nov. 16, 2005 (FR) ..................................... 05 53480

(51) Int. Cl.
*B42D 15/00* (2006.01)
*G03B 25/02* (2006.01)

(52) U.S. Cl.
USPC .................... 283/85; 283/86; 283/72; 40/454

(58) Field of Classification Search .................... 283/85, 283/86, 72; 40/454
See application file for complete search history.

(56) References Cited

U.S. PATENT DOCUMENTS

| | | | |
|---|---|---|---|
| 4,856,857 | A | 8/1989 | Takeuchi et al. |
| 5,301,981 | A | 4/1994 | Nesis |
| 5,492,370 | A | 2/1996 | Chatwin et al. |

(Continued)

FOREIGN PATENT DOCUMENTS

| | | | |
|---|---|---|---|
| CH | 689 680 | A5 | 8/1999 |
| CH | 691 750 | A5 | 9/2001 |

(Continued)

OTHER PUBLICATIONS

Commander et al., Security device based on customized microprism film, Mar. 10, 2005, Great Britain application No. GB 0504959.8.*

(Continued)

*Primary Examiner* — Joanne Silbermann
*Assistant Examiner* — Syed A Islam
(74) *Attorney, Agent, or Firm* — Oliff & Berridge, PLC

(57) ABSTRACT

An optical structure comprising first and second opposite outside faces, at least a first interface comprising a first screen of microreliefs and arranged in such a manner that travel through the first interface from the first outside face towards the second outside face, passes from a first medium having a first refractive index to a second medium having a second refractive index that is greater than the first, and at least one second interface comprising a second screen of microreliefs and arranged in such a manner that travel through the second interface from the first outside face towards the second outside face, passes from a third medium having a third refractive index to a fourth medium having a fourth refractive index less than the third.

33 Claims, 3 Drawing Sheets

U.S. PATENT DOCUMENTS

| | | | | |
|---|---|---|---|---|
| 5,760,961 | A | 6/1998 | Tompkin et al. | |
| 7,290,802 | B1 * | 11/2007 | Scarbrough et al. | 283/41 |
| 7,333,268 | B2 * | 2/2008 | Steenblik et al. | 359/619 |
| 7,903,308 | B2 * | 3/2011 | Commander et al. | 359/2 |
| 2005/0104364 | A1 | 5/2005 | Keller et al. | |

FOREIGN PATENT DOCUMENTS

| | | | |
|---|---|---|---|
| EP | 0 328 086 | A2 | 8/1989 |
| EP | 0 537 439 | A1 | 4/1993 |
| JP | A-2001-315472 | | 11/2001 |
| WO | WO 98/13211 | A1 | 4/1998 |
| WO | WO 02/03104 | A2 | 1/2002 |
| WO | WO 03/053713 | A1 | 7/2003 |
| WO | WO 03/055692 | A1 | 7/2003 |
| WO | WO 03/068525 | A1 | 8/2003 |
| WO | WO 03/082598 | A2 | 10/2003 |
| WO | WO 2006/095161 | A2 | 9/2006 |
| WO | WO 2006/108607 | A2 | 10/2006 |
| WO | WO 2007/051529 | A1 | 5/2007 |
| WO | WO 2007/057613 | A1 | 5/2007 |

OTHER PUBLICATIONS

Brockhaus ABC “Physik.” pp. 88-89. 1989. Leipzig Germany.

Third Party Opposition issued Nov. 25, 2009 in EP Application No. 06831348.5 from Giesecke & Devrient GmbH (with English translation).

Third Party Opposition issued Nov. 25, 2009 in EP Application No. 06831348.5 from Leonhard Kurz Stiftung & Co. KG (with English translation).

* cited by examiner

Fig.6
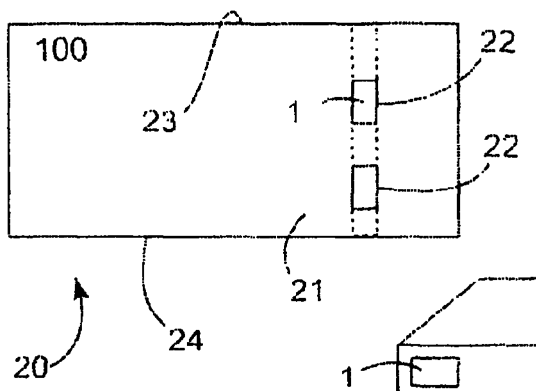
Fig.7
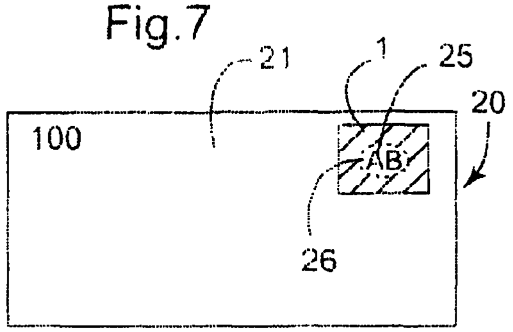
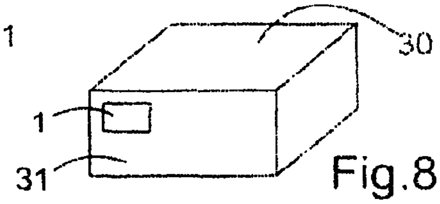
Fig.8
Fig.14
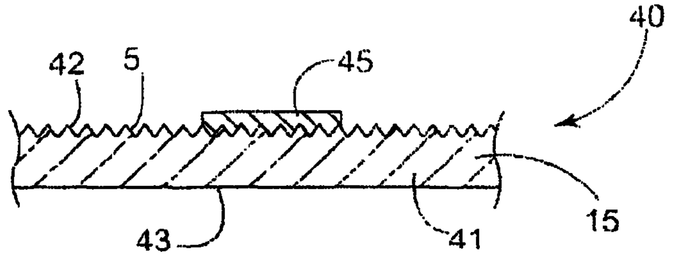
Fig.15
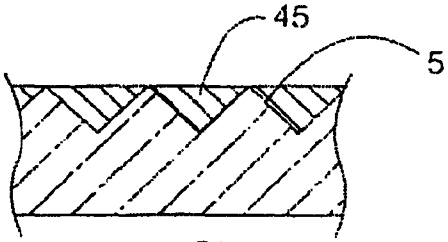
Fig.16
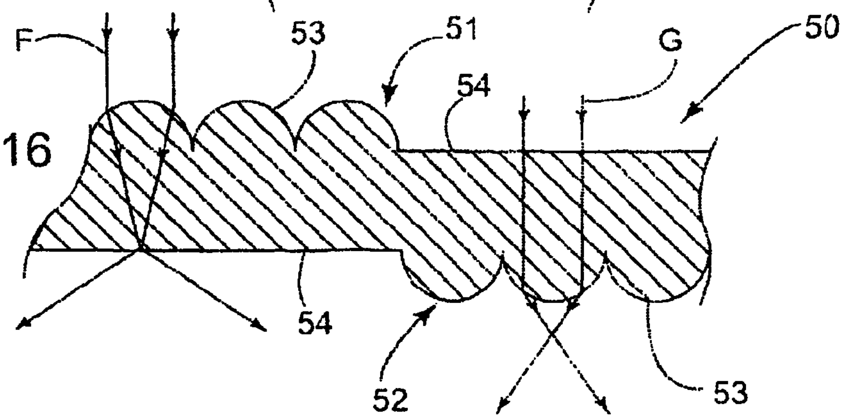

OPTICAL STRUCTURE, IN PARTICULAR FOR A SECURITY DOCUMENT AND/OR A DOCUMENT OF VALUE

The present invention relates to an optical structure, in particular for a security document and/or a document of value.

International application WO 03/082598 discloses a document having, on one face, a security device comprising two superposed structures, each capable of generating a holographic image. Depending on the angle of observation, the holographic image of one or other of the structures appears.

U.S. Pat. No. 5,301,981 describes a tape having microreliefs on a first face forming a lenticular screen. On a second face opposite to the first, the tape presents a succession of parallel black strips disposed in such a manner that when the tape is observed in a direction perpendicular to its plane, light rays are directed by the microreliefs onto the black strips. This gives a black image forming a mask for hiding the information that appears on the document having the tape apposed thereon.

International application WO 02/03104 discloses an optical structure capable of creating a first image in reflection, e.g. a holographic image, and a second image in transmission.

International application WO 03/055692 discloses a document having a structure of prismatic reliefs applied thereto that is totally reflective at a certain angle of observation so as to mask information appearing on the document, and that is transparent at another angle of observation so as to make the information apparent.

The invention proposes an optical structure, in particular for a security document and/or a document of value, enabling novel optical effects to be created, in particular for reinforcing the security of the document against any possible attempt at counterfeiting it.

Thus, in one of its aspects, the invention provides an optical structure, in particular for a security document and/or a document of value, the structure comprising:

- first and second opposite outside faces;
- at least a first interface comprising a first screen of microreliefs and arranged in such a manner that travel through said interface from the first outside face towards the second outside face, passes from a first medium having a first refractive index to a second medium having a second refractive index that is greater than the first; and
- at least one second interface comprising a second screen of microreliefs and arranged in such a manner that travel through said second interface from the first outside face towards the second outside face, passes from a third medium having a third refractive index to a fourth medium having a fourth refractive index less than the third;

each interface having at least one portion that is offset relative to the other interface when the structure is observed in a direction substantially perpendicular to at least one of the outside faces.

By way of example, the interfaces may generate optical effects, possibly effects that vary with angle of observation, and that are different from one interface to the other.

The invention thus makes it possible in visible and/or infrared and/or ultraviolet light to create novel visual effects, e.g. for the purpose of improving the appearance of a document and/or its security against attempted counterfeiting.

Where appropriate, the interfaces may be completely offset one relative to the other, i.e. without any portions that overlap.

When at least one of the interfaces presents an outline defining a pattern, as a positive or as a negative, the pattern may present a visual appearance that differs from the visual appearance of the zone surrounding it.

By way of example, the pattern may comprise an alphanumeric character, a symbol, a logo, or a drawing.

In an embodiment of the invention, at least one of the screens of microreliefs is superposed at least in part, and in particular exactly, on a zone of one of the outside faces, which zone is substantially smooth, having no microrelief.

By way of example, at least one of the interfaces may be formed on one of the outside faces of the structure.

At least one of the first and fourth media may be formed by ambient air.

By way of example, the second and third media may be formed by the same material and may have the same refractive index, in particular a material having a refractive index greater than 1, in particular greater than 1.5, e.g. 2.

In a variant, the second and third media may be formed by different materials and/or materials having different refractive indices.

By way of example, the first medium may be formed by a first material having the first screen of microreliefs formed thereon, and the second medium may be formed by a second material deposited on the first material, in particular by vacuum deposition.

The second material may cover the first material completely or in part, and if so desired it may form at least one pattern. Where appropriate, the second material may form outer protection for the optical structure and may present a refractive index that is greater than 1.8, for example.

By way of example, the second material may be obtained by vaporization, e.g. vaporizing zinc sulfide having a refractive index of about 2.3.

Preferably, the difference between the second refractive index and the first refractive index is greater than 0.1, more preferably greater than 0.15, better greater than 0.2 or 0.3 or 0.4. This difference preferably lies in the range 0.4 to 0.6.

Preferably, the difference between the third refractive index and the fourth refractive index is greater than 0.1, more preferably than 0.15, better greater than 0.2 or 0.3 or 0.4. This difference preferably lies in the range 0.4 to 0.6.

In an embodiment of the invention, at least one of the interfaces is arranged in such a manner that for at least a first range of angles of observation, a fraction of the structure that is in register with said interface appears to be substantially transparent when the structure is observed from one of the first and second outside faces, in particular in visible and/or infrared and/or ultraviolet light.

At least one of the interfaces may be arranged in such a manner that for at least a second range of angles of observation, a fraction of the structure that is in register with said interface appears to be substantially reflective when the structure is observed from an outside face, in particular in visible and/or infrared and/or ultraviolet light.

Advantageously, at least one of the interfaces is arranged in such a manner that, for a first range of angles of observation, a fraction of the structure that is in register with said interface appears to be substantially transparent when the structure is observed from a predetermined outside face, and for a second range of angles of observation, said fraction of the structure appears substantially reflective when the structure is observed from said outside face.

Thus, when the interface(s) present(s) an outline defining a pattern, the pattern may appear in visible light either with a reflective appearance or with a transparent appearance, depending on the angle of observation of the structure.

Where appropriate, the invention can make it possible, by varying the angle of observation, to perceive the pattern in succession as a positive with a reflective appearance and surrounded by a transparent zone, and as a negative with a transparent appearance surrounded by a reflective zone.

In an embodiment of the invention, at least one of the microreliefs is substantially in the form of a triangular prism.

By way of example, the screen of microreliefs may be arranged in such a manner as to reproduce a metal-plated appearance, in particular a reflective appearance, when the optical structure is observed in a predetermined range of angles.

By way of example, the screen(s) of microreliefs may be analogous to that present on the film sold by the supplier 3M under the name Scotch™ Optical Lighting Film.

In another embodiment of the invention, at least one of the microreliefs includes at least one curved surface that is concave or convex, each curved surface being capable of creating a lens effect.

By way of example, the curved surface may be a semicylindrical surface or a surface in the form of a spherical cap, in particular a hemispherical cap, this list not being limiting.

Preferably, the microreliefs present thickness greater than the wavelengths of visible light, possibly greater than the wavelengths of near infrared or ultraviolet light.

By way of example, the microreliefs may present thickness greater than 1 micrometer (μm).

Preferably, the microreliefs present thickness less than 10 millimeters (mm), in particular less than 1 mm.

In an embodiment of the invention, at least some of the microreliefs extend in a longitudinal direction, the microreliefs being substantially parallel to one another.

The microreliefs of the first and second screens, respectively, may be identical, or in a variant, different, e.g. having different shapes and/or different dimensions.

The microreliefs of the first and second screens may be made on a common support, on one face of said support or on two opposite faces thereof.

By way of example, the optical structure may comprise a support having a screen of microreliefs on at least one face, the screen of microreliefs being covered in part by a coating layer having a refractive index greater than that of the support so that the first interface is formed between the support and ambient air, and the second interface between the support and the coating layer, the first and second interfaces being, in particular, adjacent. The coating layer may comprise zinc sulfide, for example.

The optical structure of the invention can thus be made in relatively easy manner, because a single set of microreliefs can serve to form both interfaces.

In another embodiment of the invention, the first and second screens of microreliefs may be made on distinct supports.

If so desired, the structure may include at least one material that is electrically conductive.

Authentication and/or identification of the structure can thus be based on measuring its electrical conductivity, in addition to observing it visually.

In an embodiment of the invention, the structure includes at least one support having made thereon at least some microreliefs, the support being made of a material that is substantially transparent, such as polyester or polymethylmethacrylate (PMMA).

The support may include an electrically conducive layer, e.g. based on a conductive polymer such as polythiophene or its derivatives or based on an indium tin oxide composite.

The structure need not have any metal, in particular it need not have a metal-plated layer.

In an embodiment of the invention, the optical structure may be in the form of a strip of width lying in particular in the range 1.5 mm to 100 mm, more particularly in the range 2 mm to 45 mm.

In a variant, the structure may present substantially one of the following shapes: a polygonal shape, e.g. rectangular or square; an oval shape; a circular shape; this list not being limiting.

Where appropriate, the structure may be arranged to be capable of being transferred at least in part onto a face of a document, the structure possibly including at least one adhesive layer.

In addition to the screen of microreliefs, the structure may include at least one authentication and/or identification element selected from at least one of the following elements: an element for revealing tampering, in particular an element that is visible and/or detectable with the help of a specific detection device; an element presenting a variable optical effect due to interference and/or diffraction, iridescence, or to liquid crystals; a magnetic coating; tracers detectable by X-ray fluorescence; biomarkers; a varnish or an ink; luminescent, fluorescent, or phosphorescent tracers; photochromic, thermochromic, electroluminescent, and/or piezochromic compounds; and/or compounds that change color on contact with one or more predetermined substances.

Where appropriate, the structure may include at least one material that is fluorescent under infrared and/or ultraviolet radiation, e.g. deposited in the form of a layer, in particular on one of the faces of the structure.

The invention thus makes it possible, under excitation from infrared and/or ultraviolet radiation, to observe in visible light an underlying fluorescent layer through the fraction of the structure that appears transparent in the first range of angles of observation.

In the second range of angles of observation, the above-mentioned fraction of the structure is reflective, so it is not possible to observe the fluorescence of the underlying layer.

According to another of its aspects, independently or in combination with the above, the invention also provides an optical structure including at least one screen of microreliefs arranged in such a manner that over a first range of angles of observation, the fraction of the structure covered by the screen appears to be substantially reflective when observed from a predetermined face, and over a second range of angles of observation, said fraction appears to be substantially transparent when the structure is observed from said face.

In an embodiment of the invention, the structure is arranged in such a manner that when it is observed from a predetermined face at a predetermined angle, it presents both at least one zone that is substantially transparent and at least one zone that is substantially reflective.

According to another of its aspects, the invention provides a sheet material including an optical structure as defined above.

The term “sheet material” is used in the description and the claims to designate a fiber sheet based on cellulose and/or synthetic fibers presenting a single or multi-layer structure, that is optionally composite. A sheet material may for example present a thickness that is relatively small, in particular less than or equal to 3 mm, e.g. equal to about 100 μm, and it may be flexible. In a first embodiment of the invention, the sheet material may be packaged as a roll, in particular prior to being cut to the desired format. The term “sheet material” can also designate a flexible or rigid film, having a monolithic or multi-layer structure.

The optical structure advantageously includes at least one fraction that is visible on one of the faces of the sheet material.

The optical structure may be embedded in part in the thickness of the sheet material, which material may include in particular at least one window leaving the optical structure uncovered.

When the optical structure is in the form of a strip, it may extend from a first edge of the sheet material to a second edge, opposite from the first.

In a variant, the optical structure is placed on a face of the sheet material, e.g. being adhesively bonded on said face.

In an embodiment of the invention, the sheet material includes at least one information element such as an alphanumeric character, a symbol, a logo, or a drawing, the optical structure being arranged in such a manner as to be capable of substantially masking the information element when said structure is observed in a first range of angles and presents a reflective appearance.

The sheet material may comprise at least a fiber layer, or in a variant, a plastics material.

Depending on circumstances, at least one of the first and second outside faces of the optical structure may be in contact with ambient air or with the fiber material of the sheet.

In another of its aspects, the invention also provides a security document and/or a document of value including a sheet material as defined above.

The document may constitute one of the following elements: an identity document; a passport sheet or cover; a visa; a coupon; a document of value other than a bank note, e.g. a check or a credit card; a protective and/or authentication label; a traceability label.

In another of its aspects, the invention also provides a packaging device, in particular a package, including a sheet material as defined above.

In another of its aspects, the invention also provides a method of authenticating and/or identifying an article, in particular a document, the article including an optical structure as defined above, and the method comprising the following steps:

- observing the visual effects, in particular a transparent and/or reflective appearance of the optical structure, in particular from at least two different angles; and
- coming to a conclusion about the authenticity and/or the identity of the article at least with the help of this observation.

When the optical structure includes at least one electrically conductive material, in particular a non-metallic material, e.g. a conductive polymer, the method may include the following steps:

- measuring the electrical conductivity of the structure; and
- coming to a conclusion about the authenticity and/or the identity of the article at least with the help of said measurement.

The invention can be better understood on reading the following detailed description of non-limiting embodiments of the invention, and on examining the accompanying drawings, in which:

FIGS. 6 and 7 are diagrammatic and fragmentary views of two documents constituting examples of the invention;

FIG. 8 is a diagrammatic and fragmentary perspective view of a package in accordance with the invention; and FIGS. 9 to 16 are diagrammatic and fragmentary section views showing various examples of optical structures in accordance with the invention.

Figures 1, 2, 3, 4, 5:
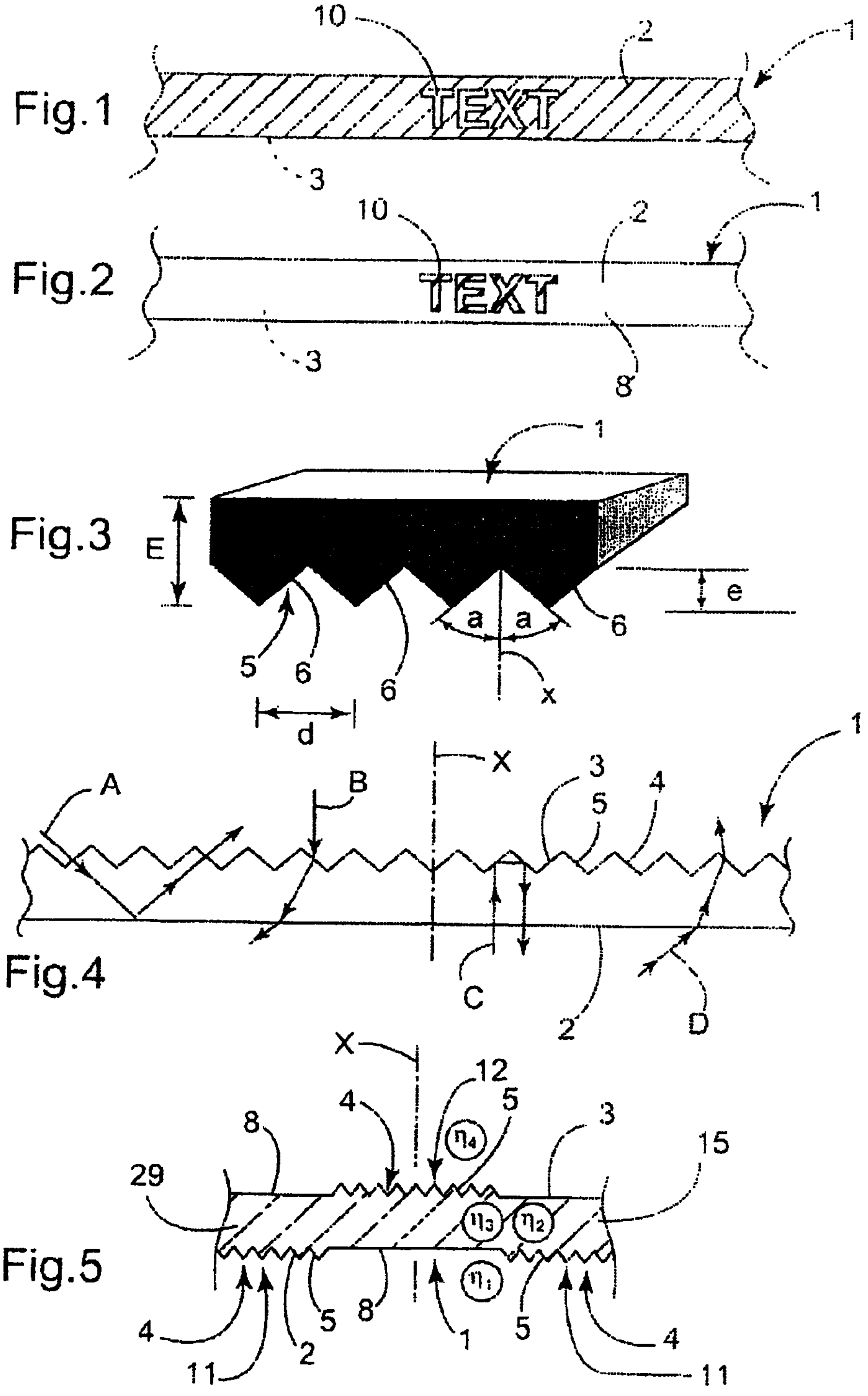
FIGS. 1 and 2 are fragmentary diagrammatic views of an optical structure in accordance with the invention, as observed from two different respective angles.
FIG. 3 is a diagrammatic and fragmentary view of a screen of microreliefs of the optical structure of FIGS. 1 and 2.
FIG. 4 shows very diagrammatically the paths of light rays in the structure of FIG. 3.
FIG. 5 is a diagrammatic and fragmentary section view of the FIG. 1 optical structure.

In the drawings, for reasons of clarity, the relative proportions of the various elements shown are not always complied with, these views being diagrammatic.

FIGS. 1, 2, and 5 show an optical structure 1 constituting an embodiment of the invention, presenting first and second opposite outside faces 2 and 3.

On each of the faces 2 and 3, the optical structure 1 has at least one screen 5 of microreliefs extending over a fraction 4 only of the corresponding face 2 or 3, as shown in FIG. 5.

FIG. 1 shows a first interface 11 and a second interface 12 formed by the screens 5 of microrelief on the first and second faces 2 and 3, respectively, as shown in FIG. 5.

In the example described, each screen 5 is made up of microreliefs 6, as shown in FIG. 3, in the form of triangular prisms each presenting dimensions in cross-section that are greater than the wavelengths of visible light, and possibly of light in the near infrared. These dimensions, and in particular the thickness e of the microrelief, may for example be greater than 1 μm, and in particular greater than 1.2 μm.

By way of example, the distance d between the crests of two adjacent prisms may lie in the range 100 μm to 900 μm, e.g. being close to 350 μm.

By way of example, the thickness e of a prism may lie in the range 50 μm to 300 μm, e.g. being close to 170 μm.

The maximum thickness E of the optical structure 1 may lie in the range 100 μm to 900 μm, e.g. being close to 500 μm.

As shown in FIG. 3, the angle a between the local normal X to the optical structure 1 and a face of a microrelief 6 may lie in the range 30° to 60°, e.g. being close to 45°.

The dimensions and the angles of the microreliefs 6 are advantageously selected as a function of the refractive index (ices) of the material(s) used in the structure 1.

In the example described, the microreliefs 6 form parallel striae.

By way of example, the screen 5 of microreliefs may be analogous to that present on the film sold by the US supplier 3M under the name Scotch™ Optical Lighting Film.

The structure 1 is preferably flexible, e.g. being foldable.

The microreliefs 6 are made on a material 15 having a refractive index greater than that of air, which material may be constituted, for example, by a transparent polymer, such as polyester or PMMA.

The microreliefs 6 may be obtained by etching, mechanically, or chemically, for example.

In a variant, the microreliefs 6 may be obtained by printing an ink or by embossing.

Travel through the first interface 11 from the first face 2 towards the second face 3, passes through a first medium of refractive index $n_1$ (constituted by ambient air) to a second medium (constituted by the material 15) of refractive index $n_2$ greater than $n_1$.

Travel through the second interface 12 from the first face 2 towards the second face 3, passes through a third medium of refractive index $n_3$ (formed by the material 15, with $n_3=n_2$) to a fourth medium (formed by ambient air) of refractive index $n_4$ that is smaller. We thus have $n_4=n_1$.

Each screen 5 of microreliefs on the face 2, or on the face 3, exactly overlaps a substantially smooth zone 8 of the other face.

As shown in FIG. 4, a light ray A penetrating the optical structure 1 in a fraction 4 of the second face 3 that has a screen 5 of microreliefs, and at an angle of incidence lying in the range [$a_1$; $a_2$] relative to the normal X, is reflected by the opposite face 2 so that the fraction of the structure 1 that is in register with the screen 5 has a reflective appearance.

A light ray B penetrating into the optical structure via the fraction 4, but at an angle of incidence lying in the range [$a_0$; $a_1$] relative to the normal X, leaves through the opposite face 2 so the fraction of the structure 1 that is in register with the screen 5 appears to be transparent.

By way of example, the angles $a_0$, $a_1$, and $a_2$ may be substantially equal to 0°, 45°, and 90°, respectively.

A light ray C penetrating the optical structure 1 in a substantially smooth zone 8 of the first face 2 at an angle of incidence lying in the range [$a_3$; $a_4$] relative to the normal X is reflected by the screen 5 of microreliefs on the opposite face 3 so that the fraction of the structure that is in register with the screen 5 appears to be substantially reflective.

A light ray D penetrating into the optical structure 1 via the zone 8 at an angle of incidence lying in the range [$a_4$; $a_5$] relative to the normal X, leaves through the opposite face 3 so that the fraction of the structure 1 that is in register with the screen 5 appears to be substantially transparent.

By way of example, the angles $a_3$, $a_4$, and $a_5$ may be substantially equal to 0°, 45°, and 90°, respectively.

The screen(s) 5 of microreliefs serves to define at least one positive or negative pattern 10, e.g. formed by text, a symbol, a logo, and/or a drawing.

When the optical structure 1 is observed from the face 2 over a first range of angles, e.g. corresponding to the range [$a_4$; $a_5$], the pattern 10 may appear to be substantially transparent and surrounded by a zone that is substantially reflective, as shown in FIG. 1.

When the structure 1 is observed from the face 2 over a different range of angles, e.g. corresponding to the range [$a_3$; $a_4$], then the pattern 10 may appear to be substantially reflective surrounded by a zone that is substantially transparent, as shown in FIG. 2.

When appropriate, the structure 1 may comprise a succession of patterns 10 repeating regularly in some direction.

The screen 5 of microreliefs may be arranged so as to reproduce a reflective metallic appearance depending on the angle of observation.

The material 15 on which the screens 5 of microreliefs are formed maybe based on a transparent polymer.

Where appropriate, authentication and/or identification with the help of the structure 1 may comprise the following steps:

measuring the electrical conductivity of the structure 1; and coming to a conclusion about the authenticity and/or the identity of the structure 1 on the basis at least of said measurement.

The structure 1 may be in the form of a strip of width lying in particular in the range 1.5 mm to 100 mm.

FIG. 6 shows a security document and/or a document of value 20 constituted by a bank note or bill, the document comprising a sheet material 21 formed by a fiber layer in which the optical structure 1 is embedded in part.

The structure 1 extends from a first edge 23 of the sheet material 21 to a second edge 24 opposite from the first.

The sheet material 21 may include one or more windows 22 revealing the optical structure 1.

The window(s) may be made, for example, by portions in relief present on a rotary cylinder of a papermaking machine used for making the sheet material, as described for example in patent applications EP 0 860 298 and EP 0 625 431.

FIG. 7 shows an optical structure 1 presenting a shape that is substantially rectangular, for example, this structure 1 being placed on one of the faces of the sheet material 21, without being embedded in the thickness of this material 21, e.g. being stuck thereon with the help of an adhesive layer, possibly under temperature and pressure.

The optical structure 1 can be arranged to mask at least one information element 25 present on the sheet material 21 when the structure 1 presents its reflective appearance. The information element 25 becomes visible through a fraction 26 of the structure 1 when observed at an appropriate angle of observation.

By way of example, the information element 25 may be printed on a face of the sheet material 21.

In a variant, the document 20 may constitute one of the following elements: an identity document; a passport sheet or cover; a visa; a coupon; a document of value other than a bank note, e.g. a check or a credit card; a protective and/or authentication label; a traceability label.

FIG. 8 shows a packaging device 30 such as a package, e.g. a box, with an optical structure 1 placed on a face 31 of the box 30.

In addition to the screen(s) 5 of microreliefs, the optical structure 1 may include at least one authentication and/or identification element selected from at least of the following elements: an element for revealing tampering, in particular an element that is visible and/or detectable with the help of a specific detection device; an element presenting a variable optical effect due to interference and/or diffraction, iridescence, or to liquid crystals; a magnetic coating; tracers detectable by X-ray fluorescence; biomarkers; a varnish or an ink; luminescent, fluorescent, or phosphorescent tracers; photochromic, thermochromic, electroluminescent, and/or piezochromic compounds; and/or compounds that change color on contact with one or more predetermined substances.

The optical structure 1 may comprise a one-piece support 29 based on the material 15, having the screens 5 of microreliefs formed on the faces 2 and 3 thereof, as shown in FIG. 5.

Figure 9:
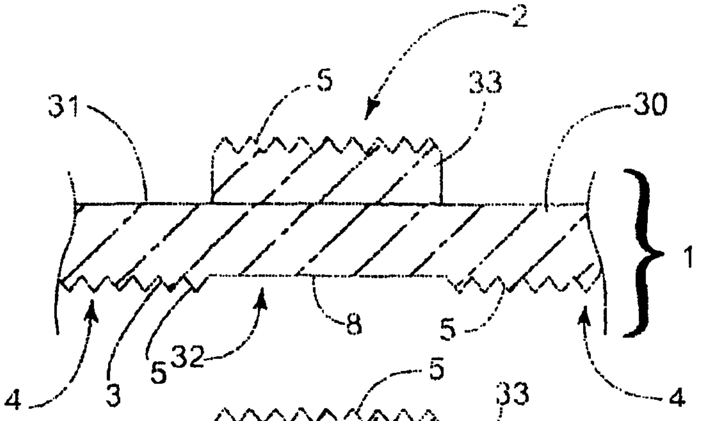

In a variant, as shown in FIG. 9, the optical structure 1 may comprise a one-piece support 30, such as a film, presenting a first face 31 that is completely smooth and, on a second face 32 opposite the first face 31, fractions 4 that are covered by one or more screens 5 of microreliefs separated by zones 8 that are substantially smooth.

The structure 1 also includes at least one element 33 of smaller area than the support 30 and fastened, e.g. by adhesive, on the face 31 of the support 30, which element 33 has on one of its faces a screen 5 of microreliefs that exactly covers a substantially smooth zone 8 of the face 32 of the support 30.

The outside face 2 of the structure 1 is formed both by the face 31 of the support 30 and by the screen 5 of microreliefs of the element 33.

By way of example, the microreliefs 5 may be initially present over the entire face 32 of the support 30 and some of the microreliefs may be subjected to treatment so as to be eliminated, e.g. by chemical attack or by mechanical action, so as to create the substantially smooth zones 8.

Figure 10:
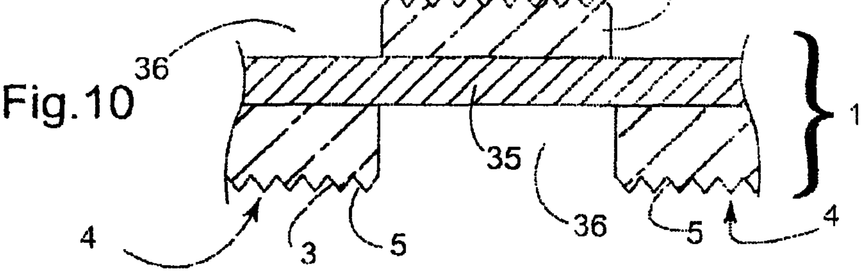

In the example shown in FIG. 10, the optical structure 1 is formed by a plurality of elements 33 disposed on either side of an intermediate support 35, e.g. formed by a transparent film, so that a screen 5 of microreliefs on an element 33 on one face of the support 35 is placed in register with a zone 36 on the other face of the support that does not include an element 33.

Figure 11:
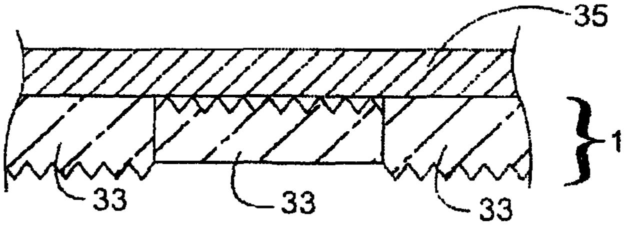

In a variant, as shown in FIG. 11, the elements 33 may be placed on the same side of the support 35, e.g. formed by an adhesive transparent film. At least one of the elements 33 may be obtained for example by being cut out from a one-piece support 30 having microreliefs, and at least one of the elements 33 may be turned the other way up and put into the space left empty by cutting out.

Figure 12:
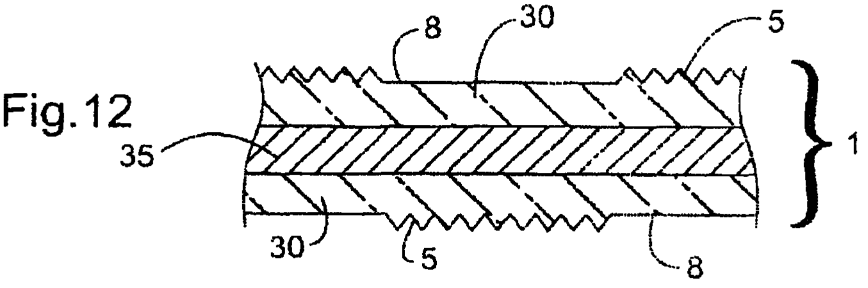

In the example shown in FIG. 12, the optical structure 1 has two supports 30 with microreliefs, which supports are fastened on two opposite faces of an intermediate support 35.

Figure 13:
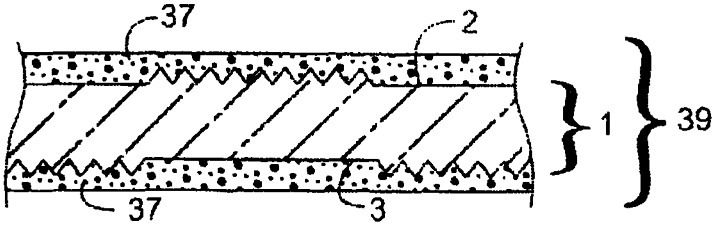

In the example shown in FIG. 13, the optical structure 1 is covered on each of its two opposite faces 2 and 3 in a layer of a coating 37 such as a transparent varnish. The resulting assembly 39 presents outside faces that are substantially smooth.

The layers 37 on the faces 2 and 3 may have refractive indices that are identical or otherwise.

FIG. 14 shows an optical structure 40 comprising a support 41 made on the basis of a transparent polymer material, possibly associated with an electrically conducive polymer, and presenting opposite faces 42 and 43.

In the example shown, the face 42 of the support 41 is covered entirely by a screen 5 of microreliefs.

The face 43 is entirely smooth without any microrelief.

The optical structure 50 also includes a coating layer 45 covering the screen 5 of microreliefs over a fraction of the face 42.

By way of example, the coating layer 45 may be obtained by vacuum deposition, in particular by vaporization, of a material having a refractive index greater than that of the material of the support 41.

By way of example, the coating layer 45 contains zinc sulfide having a refractive index of about 2.3, the support 41 being made for example on the basis of a polymer having a refractive index of about 1.5.

The structure 40 thus presents two interfaces formed by the microreliefs 5. One of the interfaces lies between the material 15 and ambient air, and the other of the interfaces lies between the material 15 and the material of the coating layer 45, thus making it possible to produce optical effects that differ with angle of observation.

The coating layer 45 may present a thickness greater than the thickness of the screen 5 of microreliefs, as shown in FIG. 14.

In a variant, the coating layer 45 may present a maximum thickness that is substantially equal to the thickness of the screens 5 of microreliefs, as shown in FIG. 15.

If so desired, the layer 45 may form a pattern.

Naturally, the invention is not limited to the embodiments described above.

For example, the microreliefs may be of a shape other than prismatic.

FIG. 16 shows an optical structure 50 presenting on each of its opposite faces 51 and 52 at least one screen 53 of microreliefs, each microrelief being substantially semicylindrical in shape.

Each screen 53 of microreliefs extends in register with a substantially smooth fraction 54 of the opposite face.

The microreliefs 53 form lenses producing optical effects that differ depending on whether the light passes initially through the screen 53 of microreliefs or through the substantially smooth zone 54, as can be understood from the paths of the light rays F and G shown in FIG. 16.

The characteristics of the various embodiments described above can be combined with one another to produce variants that are not shown.

The term “comprising a” should be understood as being synonymous with “comprising at least one” unless specified to the contrary.

The invention claimed is:

1. A security document and/or a document of value, comprising a sheet material including an optical structure comprising:

first and second opposite outside faces;

at least a first interface comprising a first screen of microreliefs and arranged in such a manner that travel through said first interface from the first outside face towards the second outside face, passes from a first medium having a first refractive index to a second medium having a second refractive index that is greater than the first; and at least one second interface comprising a second screen of microreliefs and arranged in such a manner that travel through said second interface from the first outside face towards the second outside face, passes from a third medium having a third refractive index to a fourth medium having a fourth refractive index less than the third;

wherein said first and second interfaces are completely offset one relative to the other when the structure is observed in a direction substantially perpendicular to at least one of the outside faces, wherein at least one of the first screen of microreliefs and the second screen of microreliefs overlap exactly a substantially smooth zone of one of the outside faces; and wherein light is able to travel between the at least one first interface and the at least one second interface.

2. A document according to claim 1, in which at least one of the interfaces presents an outline defining a pattern such as an alphanumeric character, a symbol, a logo, or a drawing.

3. A document according to claim 1, in which at least one of the interfaces is formed on at least one of the outside faces of the structure.

4. A document according to claim 1, in which at least one of the first and fourth media is formed by ambient air.

5. A document according to claim 1, in which the second and third media are formed of the same material.

6. A document according to claim 1, in which the second and third media are formed of materials that are different and/or that have different refractive indices.

7. A document according to claim 1, in which the first medium is formed by a first material on which the first screen of microreliefs is made, and the second medium is formed by a second material that is deposited on the first material, in particular by vacuum deposition.

8. A document according to claim 1, in which at least one of the interfaces is arranged in such a manner that for at least a first range of angles of observation, a fraction of the structure that is in register with said interface appears to be substantially transparent when the structure is observed from one of the first and second outside faces.

9. A document according to claim 8, said interface being arranged to be transparent to visible and/or infrared and/or ultraviolet light in the first range of angles of observation.

10. A document according to claim 8, in which at least one of the interfaces is arranged in such a manner that, for a first range of angles of observation, a fraction of the structure that is in register with said interface appears to be substantially transparent when the structure is observed from a predetermined outside face, and for a second range of angles of observation, said fraction of the structure appears substantially reflective when the structure is observed from said outside face.

11. A document according to claim 1, in which at least one of the interfaces is arranged in such a manner that for at least a second range of angles of observation a fraction of the structure that is in register with said interface appears to be substantially reflective when the structure is observed from an outside face.

12. A document according to claim 11, said interface being arranged to reflect visible and/or infrared and/or ultraviolet light for the second range of angles of observation.

13. A document according to claim 1, in which at least one of the microreliefs is substantially in the form of a triangular prism.

14. A document according to claim 13, in which at least one of the screens of microreliefs is arranged in such a manner as to reproduce a metal-plated appearance, in particular a reflective appearance, when the optical structure is observed in a predetermined range of angles.

15. A document according to claim 1, in which at least one of the microreliefs includes at least one curved surface that is concave or convex.

16. A document according to claim 1, in which the microreliefs present a thickness greater than the wavelength of visible light.

17. A document according to claim 1, in which at least some of the microreliefs extend in a longitudinal direction, the at least some of the microreliefs being substantially parallel to one another.

18. A document according to claim 1, in which the microreliefs in the first and second screens respectively are identical.

19. A document according to claim 1, in which the microreliefs of the first and second screens are made on a common support.

20. A document according to claim 1, comprising a support having a screen of microreliefs on at least one face, the screen of microreliefs being covered in part by a coating layer having a refractive index greater than that of the support so that the first interface is formed between the support and ambient air, and the second interface between the support and the coating layer, the first and second interfaces being, in particular, adjacent.

21. A document according to claim 1, in which the first and second screens of microreliefs are made on separate supports.

22. A document according to claim 1, including at least one electrically conductive material.

23. A document according to claim 1, including at least one support having made thereon at least some of the microreliefs, the support being made of a material that is substantially transparent, in particular a polymer.

24. A document according to claim 1, including at least one material that fluoresces under infrared and/or ultraviolet radiation.

25. A document according to claim 1, in which the difference between the second refractive index and the first refractive index and/or between the third refractive index and the fourth refractive index is greater than 0.1.

26. A document according to claim 25, in which said difference is greater than 0.2.

27. A document according to claim 25, in which said difference lies in the range 0.4 to 0.6.

28. A document according to claim 1, in which the optical structure is embedded at least in part in the thickness of the sheet material.

29. A document according to claim 28, the sheet material including at least one window leaving the optical structure uncovered.

30. A document according to claim 1, the sheet material including at least one information element, the optical structure being arranged in such a manner as to be capable of substantially masking the information element when the optical structure is observed in a first range of angles and presents a reflective appearance.

31. A document according to claim 1, the sheet material including a base of cellulose and/or synthetic fibers.

32. A document according to claim 1, in which the microreliefs present a thickness greater than the wavelength of near infrared light.

33. A document according to claim 1, in which the microreliefs present a thickness greater than 1 μm.

* * * * *

UNITED STATES PATENT AND TRADEMARK OFFICE

CERTIFICATE OF CORRECTION

PATENT NO. : 8,439,402 B2
APPLICATION NO. : 12/085033
DATED : May 14, 2013
INVENTOR(S) : Camus et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1301 days.

Signed and Sealed this
Eighth Day of September, 2015

Michelle K. Lee

Michelle K. Lee
*Director of the United States Patent and Trademark Office*